(12) United States Patent
Sakaguchi et al.

(10) Patent No.: US 12,265,204 B2
(45) Date of Patent: Apr. 1, 2025

(54) CAMERA OPTICAL LENS

(71) Applicant: AAC Optics (Suzhou) Co., Ltd., Suzhou (CN)

(72) Inventors: Takayuki Sakaguchi, Osaka (JP); Yuanshan Cui, Shenzhen (CN)

(73) Assignee: AAC Optics (Suzhou) Co., Ltd., Suzhou (CN)

( * ) Notice: Subject to any disclaimer, the term of this patent is extended or adjusted under 35 U.S.C. 154(b) by 616 days.

(21) Appl. No.: 17/542,519

(22) Filed: Dec. 6, 2021

(65) Prior Publication Data
US 2022/0187573 A1 Jun. 16, 2022

(30) Foreign Application Priority Data
Dec. 14, 2020 (CN) .......................... 202011461939.X

(51) Int. Cl.
*G02B 3/02* (2006.01)
*G02B 9/62* (2006.01)
*G02B 13/00* (2006.01)
*G02B 13/18* (2006.01)
*G02B 13/06* (2006.01)

(52) U.S. Cl.
CPC ........... *G02B 13/0045* (2013.01); *G02B 9/62* (2013.01); *G02B 13/0015* (2013.01); *G02B 13/06* (2013.01)

(58) Field of Classification Search
CPC .. G02B 9/62; G02B 13/0045; G02B 13/0015; G02B 13/06
USPC ....... 359/658, 681, 682, 713, 750–752, 755, 359/756
See application file for complete search history.

(56) References Cited

U.S. PATENT DOCUMENTS

| | | | | |
|---|---|---|---|---|
| 2017/0363843 A1* | 12/2017 | Tang | ................... | G02B 13/0045 |
| 2018/0120540 A1* | 5/2018 | Teraoka | ............. | G02B 13/0045 |
| 2021/0109320 A1* | 4/2021 | Park | ......................... | G02B 9/64 |
| 2021/0396958 A1* | 12/2021 | Dang | ..................... | G02B 9/62 |
| 2022/0003967 A1* | 1/2022 | Huang | ................... | G02B 15/10 |
| 2022/0003970 A1* | 1/2022 | Zhang | ................ | G02B 13/0045 |

* cited by examiner

*Primary Examiner* — Mahidere S Sahle
(74) *Attorney, Agent, or Firm* — W&G Law Group

(57) ABSTRACT

The present disclosure relates to a technical field of optical lenses, and discloses a camera optical lens. The camera optical lens includes six lenses. An order of the six lenses is sequentially from an object side to an image side, which is shown as follows: a first lens having a positive refractive power, a second lens having a negative refractive power, a third lens having a positive refractive power, a fourth lens having a negative refractive power, a fifth lens having a positive refractive power, and a sixth lens having a negative refractive power. The camera optical lens provided by the present disclosure has excellent optical characteristics, and further has characteristics of large aperture, wide-angle, and ultra-thin, especially suitable for mobile phone camera lens assemblies and WEB camera lenses, which are composed of camera components having high pixels, such as CCD and CMOS.

18 Claims, 7 Drawing Sheets

CAMERA OPTICAL LENS

TECHNICAL FIELD

The present disclosure relates to the field of optical lenses, and in particular to a camera optical lens suitable for handheld devices, such as smart phones, digital cameras, and imaging devices, such as monitors or PC lenses.

BACKGROUND

With emergence of smart phones in recent years, demand for miniature camera lens is increasing day by day, and because a pixel size of per photosensitive device shrinks, in addition a development trend of electronic products with good functions, and thin and portable appears, therefore, a miniaturized camera optical lens having good imaging quality becomes a mainstream in current market. In order to obtain better imaging quality, multi-piece lens structure is mainly adopted. Moreover, with development of technology and increases of diversified needs of users, a pixel area of per photosensitive device is constantly shrinking, and requirements of optical systems for imaging quality are constantly increase. A six-piece lens structure gradually appears in lens design. There is an urgent need for a wide-angled camera lens having excellent optical characteristics, a small size, and fully corrected aberrations.

SUMMARY

Aiming at above problems, the present disclosure seeks to provide a camera optical lens, which has good optical performance and meets design requirements of large aperture, ultra-thinness, and wide-angle.

In order to solve the above problems, embodiments of the present disclosure provide a camera optical lens. The camera optical lens includes six lenses. An order of the six lenses is sequentially from an object side to an image side, which is shown as follows: a first lens having a positive refractive power, a second lens having a negative refractive power, a third lens having a positive refractive power, a fourth lens having a negative refractive power, a fifth lens having a positive refractive power, and a sixth lens having a negative refractive power. A focal length of the camera optical lens is denoted as f, a focal length of the second lens is denoted as f2, a center curvature radius of an object side surface of the third lens is denoted as R5, a center curvature radius of an image side surface of the third lens is denoted as R6, an on-axis thickness of the first lens is denoted as d1, an on-axis distance, from an image side surface of the first lens to an object side surface of the second lens, is denoted as d2, an on-axis thickness of the second lens is denoted as d3, and the camera optical lens satisfies following relationships:

$4.00 \leq (d1+d2)/d3 \leq 5.50$;

$-3.00 \leq f2/f \leq -2.00$;

$0.20 \leq R5/R6 \leq 0.35$.

As an improvement, the object side surface of the first lens is convex in a paraxial region. A focal length of the first lens is denoted as f1, a center curvature radius of the object side surface of the first lens is denoted as R1, a center curvature radius of the image side surface of the first lens is denoted as R2, a total optical length of the camera optical lens is denoted as TTL, and the camera optical lens satisfies following relationships:

$0.39 \leq f1/f \leq 1.64$;

$-3.34 \leq (R1+R2)/(R1-R2) \leq -0.18$;

$0.08 \leq d1/TTL \leq 0.36$.

As an improvement, the camera optical lens satisfies following relationships:

$0.62 \leq f1/f \leq 1.31$;

$-2.09 \leq (R1+R2)/(R1-R2) \leq -0.23$;

$0.12 \leq d1/TTL \leq 0.29$.

As an improvement, a center curvature radius of the object side surface of the second lens is denoted as R3, a center curvature radius of an image side surface of the second lens is denoted as R4, a total optical length of the camera optical lens is denoted as TTL, and the camera optical lens satisfies following relationships:

$-8.99 \leq (R3+R4)/(R3-R4) \leq 3.44$;

$0.02 \leq d3/TTL \leq 0.10$.

As an improvement, the camera optical lens satisfies following relationships:

$-5.62 \leq (R3+R4)/(R3-R4) \leq 2.75$;

$0.03 \leq d3/TTL \leq 0.08$.

As an improvement, the object side surface of the third lens is convex in a paraxial region, the image side surface of the third lens is concave in a paraxial region. A focal length of the third lens is denoted as f3, an on-axis thickness of the third lens is denoted as d5, a total optical length of the camera optical lens is denoted as TTL, and the camera optical lens satisfies following relationships:

$1.66 \leq f3/f \leq 11858.63$;

$-4.14 \leq (R5+R6)/(R5-R6) \leq -1.00$;

$0.03 \leq d5/TTL \leq 0.15$.

As an improvement, the camera optical lens satisfies following relationships:

$2.66 \leq f3/f \leq 9486.91$;

$-2.59 \leq (R5+R6)/(R5-R6) \leq -1.25$;

$0.05 \leq d5/TTL \leq 0.12$.

As an improvement an object side surface of the fourth lens is concave in a paraxial region, an image side surface of the fourth lens is convex in a paraxial region. A focal length of the fourth lens is denoted as f4, a center curvature radius of the object side surface of the fourth lens is denoted as R7, a center curvature radius of the image side surface of the fourth lens is denoted as R8, an on-axis thickness of the fourth lens is denoted as d7, a total optical length of the camera optical lens is denoted as TTL, and the camera optical lens satisfies following relationships:

$-9.00 \leq f4/f \leq -1.19$;

$-16.75 \leq (R7+R8)/(R7-R8) \leq -1.48$;

$0.03 \leq d7/TTL \leq 0.11$.

As an improvement, the camera optical lens satisfies following relationships:

$-5.62 \leq f4/f \leq -1.49$;

$-10.47 \leq (R7+R8)/(R7-R8) \leq -1.86$;

$0.04 \leq d7/TTL \leq 0.08$.

As an improvement, an object side surface of the fifth lens is convex in a paraxial region, an image side surface of the fifth lens is convex in a paraxial region. A focal length of the fifth lens is denoted as f5, a center curvature radius of the object side surface of the fifth lens is denoted as R9, a center curvature radius of the image side surface of the fifth lens is denoted as R10, an on-axis thickness of the fifth lens is denoted as d9, a total optical length of the camera optical lens is denoted as TTL, and the camera optical lens satisfies following relationships:

$0.30 \leq f5/f \leq 1.74$;

$-1.51 \leq (R9+R10)/(R9-R10) \leq -0.14$;

$0.05 \leq d9/TTL \leq 0.17$.

As an improvement, the camera optical lens satisfies following relationships:

$0.48 \leq f5/f \leq 1.40$;

$-0.94 \leq (R9+R10)/(R9-R10) \leq -0.18$;

$0.08 \leq d9/TTL \leq 0.14$.

As an improvement, an object side surface of the sixth lens is convex in a paraxial region, an image side surface of the sixth lens is concave in a paraxial region. A focal length of the sixth lens is denoted as f6, a center curvature radius of the object side surface of the sixth lens is denoted as R11, a center curvature radius of the image side surface of the sixth lens is denoted as R12, an on-axis thickness of the sixth lens is denoted as d11, a total optical length of the camera optical lens is denoted as TTL, and the camera optical lens satisfies following relationships:

$-2.94 \leq f6/f \leq -0.49$;

$1.25 \leq (R11+R12)/(R11-R12) \leq 6.49$;

$0.03 \leq d11/TTL \leq 0.12$.

As an improvement, the camera optical lens satisfies following relationships:

$-1.84 \leq f6/f \leq -0.61$;

$2.00 \leq (R11+R12)/(R11-R12) \leq 5.19$;

$0.05 \leq d11/TTL \leq 0.10$.

As an improvement, an image height of the camera optical lens is IH, a total optical length of the camera optical lens is TTL, and the camera optical lens satisfies a following relationship:

$TTL/IH \leq 1.83$.

As an improvement, the camera optical lens satisfies a following relationship:

$TTL/IH \leq 1.80$.

As an improvement, a field of view of the camera optical lens is FOV, the FOV is greater than or equal to 66.19°.

As an improvement, the FOV is greater than or equal to 67.56°.

As an improvement, an F number of the camera optical lens is FNO, the FNO is less than or equal to 2.90.

As an improvement, the FNO is less than or equal to 2.84.

As an improvement, a combined focal length of the first lens and the second lens is f12, and satisfies a following relationship:

$0.51 \leq f12/f \leq 2.32$.

The beneficial effects of the present disclosure are as follows. The camera optical lens provided by the present disclosure has excellent optical characteristics, and further has characteristics of large aperture, wide-angle, and ultra-thin, especially suitable for mobile phone camera lens assemblies and WEB camera lenses, which are composed of camera components having high pixels, such as CCD and CMOS.

BRIEF DESCRIPTION OF DRAWINGS

To more clearly illustrate the technical solutions in the embodiments of the present disclosure clearer, accompanying drawings that need to be used in the description of the embodiments will briefly introduce in following. Obviously, the drawings described below are only some embodiments of the present disclosure. For A person of ordinary skill in the art, other drawings can be obtained according to these without creative labor, wherein.

DETAILED DESCRIPTION OF EMBODIMENTS

In order to make objects, technical solutions, and advantages of the present disclosure clearer, embodiments of the present disclosure are described in detail with reference to accompanying drawings in following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiment 1

Figure 1:
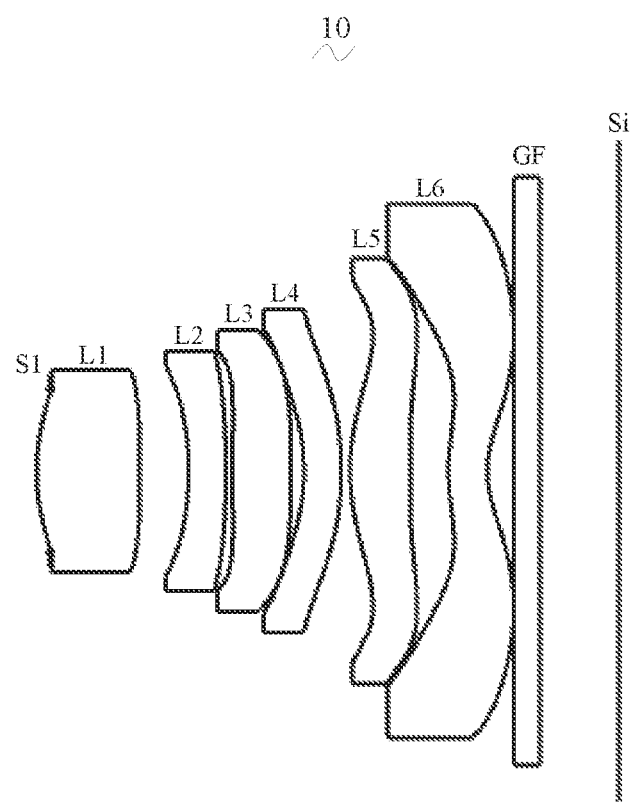
FIG. 1 is a schematic diagram of a structure of a camera optical lens according to a first embodiment of the present disclosure.

Referring to the drawings, the present disclosure provides a camera optical lens 10. FIG. 1 shows the camera optical lens 10 of a first embodiment of the present disclosure. The camera optical lens 10 includes six lenses. Specifically, an order of the camera optical lens 10 is sequentially from an object side to an image side, which is shown as follows: an aperture S1, a first lens L1, a second lens L2, a third lens L3, a fourth lens L4, a fifth lens L5, and a sixth lens L6. An optical element such as an optical filter GF may be disposed between the sixth lens L6 and an image surface Si.

In the embodiment, the first lens L1 is made of a plastic material, the second lens L2 is made of a plastic material, the third lens L3 is made of a plastic material, the fourth lens L4 is made of a plastic material, the fifth lens L5 is made of a plastic material, and the sixth lens L6 is made of a plastic material. In other alternative embodiments, the lenses may be made of other materials.

An on-axis thickness of the first lens L1 is denoted as d1, an on-axis distance, from an image side surface of the first lens L1 to an object side surface of the second lens L2, is denoted as d2, and an on-axis thickness of the second lens L2 is denoted as d3, which satisfies a following relationship: $4.00 \leq (d1+d2)/d3 \leq 5.50$ and further specifies a ratio of a sum, of the on-axis thickness of the first lens L1 and the on-axis distance from the image side surface of the first lens L1 to the object side surface of the second lens L2, to the on-axis thickness of the second lens L2. When the ratio satisfies a range of the conditional formula, a thickness of each of the first lens L1 and the second lens L2 is reasonably controlled, which is beneficial for processing of lenses, and further improves a yield of products and reduces cost.

A focal length of the camera optical lens 10 is denoted as f, and a focal length of the second lens L2 is denoted as f2, which satisfies a following relationship: $-3.00 \leq f2/f \leq -2.00$, and a negative focal power of the second lens L2 is controlled in a reasonable range to correct aberrations of an optical system.

A center curvature radius of an object side surface of the third lens L3 is denoted as R5, a center curvature radius of an image side surface of the third lens L3 is denoted as R6, which satisfies a following relationship: $0.20 \leq R5/R6 \leq 0.35$, and a ratio, of the center curvature radius of the object side surface of the third lens L3 to the center curvature radius of the image side surface of the third lens L3, is controlled to prevent a shape of the third lens L3 from being excessively bent, which is beneficial to improve processability of processing and molding the third lens L3 and further reduce the aberrations of the optical system.

In the embodiment, an object side surface of the first lens L1 is convex in a paraxial region, the image side surface of the first lens L1 is convex in a paraxial region, and the first lens L1 has a positive refractive power. In other alternative embodiments, both the object side surface and the image side surface of the first lens L1 may be replaced with other concave and convex distributions.

A focal length of the camera optical lens 10 is denoted as f, a focal length of the first lens L1 is denoted as f1, which satisfies a following relationship: $0.39 \leq f1/f \leq 1.64$ and further specifies a ratio of the focal length of the first lens L1 to the focal length of the camera optical lens 10. In a range of the conditional formula, the first lens L1 has a proper positive refractive power to reduce the aberrations of the optical system, and is further beneficial for ultra-thinness and wide-angle development. As an improvement, a following relationship is satisfied: $0.62 \leq f1/f \leq 1.31$.

A center curvature radius of the object side surface of the first lens L1 is denoted as R1, a center curvature radius of the image side surface of the first lens L1 is R2, which satisfies a following relationship: $-3.34 \leq (R1+R2)/(R1-R2) \leq -0.18$ and further reasonably controls a shape of the first lens L1, so that the first lens L1 may effectively correct spherical aberrations of the optical system. As an improvement, a following relationship is satisfied: $-2.09 \leq (R1+R2)/(R1-R2) \leq -0.23$.

The on-axis thickness of the first lens L1 is denoted as d1, a total optical length of the camera optical lens 10 is denoted as TTL, which satisfies a following relationship: $0.08 \leq d1/TTL \leq 0.36$. In a range of the conditional formula, it is beneficial to achieve ultra-thinness. As an improvement, a following relationship is satisfied: $0.12 \leq d1/TTL \leq 0.29$.

In the embodiment, the object side surface of the second lens L2 is concave in a paraxial region, an image side surface of the second lens L2 is convex in a paraxial region. The second lens L2 has a negative refractive power. In other alternative embodiments, both the object side surface and the image side surface of the second lens L2 may be replaced with other concave and convex distributions.

A center curvature radius of the object side surface of the second lens L2 is denoted as R3, a center curvature radius of the image side surface of the second lens L2 is R4, which satisfies a following relationship: $-8.99 \leq (R3+R4)/(R3-R4) \leq 3.44$ and further specifies a shape of the second lens L2. In a range of the conditional formula, with development of the lenses toward to ultra-thinness and wide-angle, it is beneficial to correct a problem of axial chromatic aberrations. As an improvement, a following relationship is satisfied: $-5.62 \leq (R3+R4)/(R3-R4) \leq 2.75$.

The on-axis thickness of the second lens L2 is denoted as d3, the total optical length of the camera optical lens 10 is denoted as TTL, which satisfies a following relationship: $0.02 \leq d3/TTL \leq 0.10$. In a range of the conditional formula, it is beneficial to achieve ultra-thinness. As an improvement, a following relationship is satisfied: $0.03 \leq d3/TTL \leq 0.08$.

In the embodiment, the object side surface of the third lens L3 is convex in a paraxial region, the image side surface of the third lens L3 is concave in a paraxial region. The third lens L3 has a positive refractive power.

The focal length of the camera optical lens 10 is denoted as f, the focal length of the third lens L3 is denoted as f3, which satisfies a following relationship: $1.66 \leq f3/f \leq 11858.63$. Through a reasonable distribution of focal power, the optical system has better imaging quality and lower sensitivity. As an improvement, a following relationship is satisfied: $2.66 \leq f3/f \leq 9486.91$.

A center curvature radius of the object side surface of the third lens L3 is denoted as R5, a center curvature radius of the image side surface of the third lens L3 is R6, which satisfies a following relationship: $-4.14 \leq (R5+R6)/(R5-R6) \leq -1.00$ and further specifies a shape of the third lens L3 and is beneficial to molding of the third lens L3. In a range of the conditional formula, it may alleviate deflection degree of light passing through the lenses and effectively reduce the aberrations. As an improvement, a following relationship is satisfied: $-2.59 \leq (R5+R6)/(R5-R6) \leq -1.25$.

An on-axis thickness of the third lens L3 is denoted as d5, the total optical length of the camera optical lens 10 is denoted as TTL, which satisfies a following relationship: $0.03 \leq d5/TTL \leq 0.15$. In a range of the conditional formula, it is beneficial to achieve ultra-thinness. As an improvement, a following relationship is satisfied: $0.05 \leq d5/TTL \leq 0.12$.

In the embodiment, an object side surface of the fourth lens L4 is concave in a paraxial region, an image side surface of the fourth lens L4 is convex in a paraxial region. The fourth lens L4 has a negative refractive power.

The focal length of the camera optical lens 10 is denoted as f, a focal length of the fourth lens L4 is denoted as f4, which satisfies a following relationship: $-9.00 \leq f4/f \leq -1.19$. Through a reasonable distribution of the focal power, the optical system has better imaging quality and lower sensitivity. As an improvement, a following relationship is satisfied: $-5.62 \leq f4/f \leq -1.49$.

A center curvature radius of the object side surface of the fourth lens L4 is denoted as R7, a center curvature radius of the image side surface of the fourth lens L4 is denoted as R8, which satisfies a following relationship: $-16.75 \leq (R7+R8)/(R7-R8) \leq -1.48$ and further specifies a shape of the fourth lens L4. In a range of the conditional formula, with the ultra-thin and wide-angle development, it is beneficial to correct aberrations of off-axis angle of view and other problems. As an improvement, a following relationship is satisfied: $-10.47 \leq (R7+R8)/(R7-R8) \leq -1.86$.

An on-axis thickness of the fourth lens L4 is denoted as d7, the total optical length of the camera optical lens 10 is denoted as TTL, which satisfies a following relationship: $0.03 \leq d7/TTL \leq 0.11$. In a range of the conditional formula, it is beneficial to achieve ultra-thinness. As an improvement, a following relationship is satisfied: $0.04 \leq d7/TTL \leq 0.08$.

In the embodiment, an object side surface of the fifth lens L5 is convex in a paraxial region, an image side surface of the fifth lens L5 is convex in a paraxial region. The fifth lens L5 has a positive refractive power.

The focal length of the camera optical lens 10 is denoted as f, a focal length of the fifth lens L5 is denoted as f5, which satisfies a following relationship: $0.30 \leq f5/f \leq 1.74$. A limitation of the fifth lens L5 may effectively make a light angle of the camera optical lens 10 smooth and reduce tolerance sensitivity. As an improvement, a following relationship is satisfied: $0.48 \leq f5/f \leq 1.40$.

A center curvature radius of the object side surface of the fifth lens L5 is denoted as R9, a center curvature radius of the image side surface of the fifth lens L5 is denoted as R10, which satisfies a following relationship: $-1.51 \leq (R9+R10)/(R9-R10) \leq -0.14$ and further specifies a shape of the fifth lens L5. In a range of the conditional formula, with the ultra-thin and wide-angle development, it is beneficial to correct the aberrations of off-axis angle of view and other problems. As an improvement, a following relationship is satisfied: $-0.94 \leq (R9+R10)/(R9-R10) \leq -0.18$.

An on-axis thickness of the fifth lens L5 is denoted as d9, the total optical length of the camera optical lens 10 is denoted as TTL, which satisfies a following relationship: $0.05 \leq d9/TTL \leq 0.17$. In a range of the conditional formula, it is beneficial to achieve ultra-thinness. As an improvement, a following relationship is satisfied: $0.08 \leq d9/TTL \leq 0.14$.

In the embodiment, an object side surface of the sixth lens L6 is convex in a paraxial region, an image side surface of the sixth lens L6 is concave in a paraxial region. The sixth lens L6 has a negative refractive power.

The focal length of the camera optical lens 10 is denoted as f, a focal length of the sixth lens L6 is denoted as f6, which satisfies a following relationship: $-2.94 \leq f6/f \leq -0.49$. Through a reasonable distribution of the focal power, the optical system has better imaging quality and lower sensitivity. As an improvement, a following relationship is satisfied: $-1.84 \leq f6/f \leq -0.61$.

A center curvature radius of the object side surface of the sixth lens L6 is denoted as R11, a center curvature radius of the image side surface of the sixth lens L6 is denoted as R12, which satisfies a following relationship: $1.25 \leq (R11+R12)/(R11-R12) \leq 6.49$ and further specifies a shape of the sixth lens L6. In a range of the conditional formula, with the ultra-thin and the wide-angle development, it is beneficial to correct the aberrations of off-axis angle of view and other problems. As an improvement, a following relationship is satisfied: $2.00 \leq (R11+R12)/(R11-R12) \leq 5.19$.

An on-axis thickness of the sixth lens L6 is denoted as d11, the total optical length of the camera optical lens 10 is denoted as TTL, which satisfies a following relationship: $0.03 \leq d11/TTL \leq 0.12$. In a range of the conditional formula, it is beneficial to achieve ultra-thinness. As an improvement, a following relationship is satisfied: $0.05 \leq d11/TTL \leq 0.10$.

In the embodiment, an image height of the camera optical lens 10 is denoted as IH, the total optical length of the camera optical lens 10 is denoted as TTL, which satisfies a following relationship: $TTL/IH \leq 1.83$, thereby being beneficial to achieve ultra-thinness. As an improvement, a following relationship is satisfied: $TTL/IH \leq 1.80$.

In the embodiment, a field of view of the camera optical lens 10 is denoted as FOV, the FOV is greater than or equal to 66.19°, thereby achieving the wide-angle. As an improvement, the FOV of the camera optical lens 10 is greater than or equal to 67.56°.

In the embodiment, an F number of the camera optical lens 10 is denoted as FNO, the FNO is less than or equal to 2.90, thereby achieving a large aperture and imaging performance of the camera optical lens is good. As an improvement, the FNO of the camera optical lens 10 is less than or equal to 2.84.

In the embodiment, the focal length of the camera optical lens 10 is denoted as f, a combined focal length of the first lens L1 and the second lens L2 is denoted as f12, which satisfies a following relationship: $0.51 \leq f12/f \leq 2.32$. Thereby, the aberrations and distortion of the camera optical lens 10 may be eliminated, a back focal length of the camera optical lens 10 may be suppressed, and miniaturization of the camera lens system group may be maintained. As an improvement, a following relationship is satisfied: $0.81 \leq f12/f \leq 1.86$.

While the camera optical lens 10 has excellent optical characteristics, the camera optical lens 10 further meets design requirements of large aperture, wide-angle, and ultra-thinness. According to the characteristics of the camera optical lens 10, the camera optical lens 10 is especially suitable for mobile phone camera lens assemblies and WEB camera lenses, which are composed of camera components having high pixels, such as CCD and CMOS.

Following examples are used to illustrate the camera optical lens 10 of the present disclosure. Symbols described in each of the examples are as follows. Units of focal length, on-axis distance, central curvature radius, on-axis thickness, inflection point position, and arrest point position are millimeter (mm).

TTL denotes a total optical length (an on-axis distance from the object side surface of the first lens L1 to the image surface Si), a unit of which is mm.

FNO denotes an F number of the camera optical lens and refers to a ratio of an effective focal length of the camera optical lens 10 to an entrance pupil diameter of the camera optical lens 10.

As an improvement, inflection points and/or arrest points may be arranged on the object side surface and/or the image side surface of the lenses, thus meeting high-quality imaging requirements. For specific implementable schemes, refer to the following.

Table 1 and table 2 show design data of the camera optical lens 10 according to a first embodiment of the present disclosure.

TABLE 1

|     | R          | d       |     | nd     | vd    |
|-----|------------|---------|-----|--------|-------|
| S1  | ∞          | d0 = −0.102 |     |        |       |
| R1  | 1.808      | d1 = 0.832 | nd1 | 1.5352 | v1 56.09 |
| R2  | −22.295    | d2 = 0.395 |     |        |       |
| R3  | −2.438     | d3 = 0.306 | nd2 | 1.6713 | v2 19.24 |
| R4  | −3.833     | d4 = 0.050 |     |        |       |
| R5  | 12732.636  | d5 = 0.471 | nd3 | 1.5470 | v3 47.14 |
| R6  | 63353.187  | d6 = 0.106 |     |        |       |
| R7  | −1.823     | d7 = 0.300 | nd4 | 1.6713 | v4 19.24 |
| R8  | −3.312     | d8 = 0.073 |     |        |       |
| R9  | 1.860      | d9 = 0.486 | nd5 | 1.5587 | v5 4.95 |
| R10 | −13.308    | d10 = 0.308 |    |        |       |
| R11 | 1.512      | d11 = 0.315 | nd6 | 1.5464 | v6 47.02 |
| R12 | 0.763      | d12 = 0.218 |    |        |       |
| R13 | ∞          | d13 = 0.210 | ndg | 1.5163 | vg 64.14 |
| R14 | ∞          | d14 = 0.640 |    |        |       |

Where, meanings of various symbols are as follows.

S1: aperture;

R: a central curvature radius of an optical surface;

R1: a central curvature radius of the object side surface of the first lens L1;

R2: a central curvature radius of the image side surface of the first lens L1;

R3: a central curvature radius of the object side surface of the second lens L2;

R4: a central curvature radius of the image side surface of the second lens L2;

R5: a central curvature radius of the object side surface of the third lens L3;

R6: a central curvature radius of the image side surface of the third lens L3;

R7: a central curvature radius of the object side surface of the fourth lens L4;

R8: a central curvature radius of the image side surface of the fourth lens L4;

R9: a central curvature radius of the object side surface of the fifth lens L5;

R10: a central curvature radius of the image side surface of the fifth lens L5;

R11: a central curvature radius of the object side surface of the sixth lens L6;

R12: a central curvature radius of the image side surface of the sixth lens L6;

R13: a central curvature radius of the object side surface of the optical filter GF;

R14: a central curvature radius of the image side surface of the optical filter GF;

d: an on-axis thickness of a lens, an on-axis distance between lenses;

d0: an on-axis distance from the aperture S1 to the object side surface of the first lens L1;

d1: an on-axis thickness of the first lens L1;

d2: an on-axis distance from the image side surface of the first lens L1 to the object side surface of the second lens L2;

d3: an on-axis thickness of the second lens L2;

d4: an on-axis distance from the image side surface of the second lens L2 to the object side surface of the third lens L3;

d5: an on-axis thickness of the third lens L3;

d6: an on-axis distance from the image side surface of the third lens L3 to the object side surface of the fourth lens L4;

d7: an on-axis thickness of the fourth lens L4;

d8: an on-axis distance from the image side surface of the fourth lens L4 to the object side surface of the fifth lens L5;

d9: an on-axis thickness of the fifth lens L5;

d10: an on-axis distance from the image side surface of the fifth lens L5 to the object side surface of the sixth lens L6;

d11: an on-axis thickness of the sixth lens L6;

d12: an on-axis distance from the image side surface of the sixth lens L6 to the object side surface of the optical filter GF;

d13: an on-axis thickness of the optical filter GF;

d14: on-axis distance from the image side surface of the optical filter GF to the image surface Si;

nd: refractive index of a d line (the d line is green light having a wavelength of 550 nm);

nd1: refractive index of a d line of the first lens L1;

nd2: refractive index of a d line of the second lens L2;

nd3: refractive index of a d line of the third lens L3;

nd4: refractive index of a d line of the fourth lens L4;

nd5: refractive index of a d line of the fifth lens L5;

nd6: refractive index of a d line of the sixth lens L6;

ndg: refractive index of a d line of the optical filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

vg: abbe number of the optical filter GF.

Table 2 shows aspheric surface data of each of the lenses in the camera optical lens 10 according to the first embodiment of the present disclosure.

TABLE 2

|    | Conic coefficient | Aspheric surface coefficients | | | | |
|    | k | A4 | A6 | A8 | A10 | A12 |
|----|---|----|----|----|-----|-----|
| R1 | 0.0000E+00 | −1.7574E−02 | −1.0056E−01 | 1.2690E+00 | −1.0719E+01 | 5.2978E+01 |
| R2 | 0.0000E+00 | −9.0994E−02 | −4.9306E−03 | −7.1302E−01 | 4.4456E+00 | −1.6997E+01 |
| R3 | 0.0000E+00 | −1.3986E−02 | 1.5783E−01 | −2.9564E+00 | 1.4717E+01 | −4.1653E+01 |
| R4 | 0.0000E+00 | 2.8047E−01 | −1.0667E+00 | 4.1579E+00 | −1.4890E+01 | 3.7792E+01 |
| R5 | 0.0000E+00 | 2.0950E−01 | −1.7986E+00 | 8.4286E+00 | −2.7319E+01 | 5.6475E+01 |
| R6 | 0.0000E+00 | −2.3744E−01 | −1.5259E−01 | 1.8526E+00 | −5.2259E+00 | 8.2863E+00 |
| R7 | 9.6364E−01 | −2.9546E−01 | 2.2302E+00 | −7.4982E+00 | 1.6934E+01 | −2.5429E+01 |
| R8 | 3.8677E+00 | −4.1112E−01 | 1.6956E+00 | −4.5185E+00 | 7.9999E+00 | −9.2253E+00 |

TABLE 2-continued

| | | | | | | |
|---|---|---|---|---|---|---|
| R9  | −6.2560E+00 | 1.3527E−01  | −4.2497E−01 | 4.6723E−01  | −2.3585E−01 | −1.4277E−02 |
| R10 | −3.0000E+01 | 5.1407E−01  | −1.1706E+00 | 1.5139E+00  | −1.2399E+00 | 6.5016E−01  |
| R11 | −1.4472E+01 | −3.1300E−01 | −4.3176E−02 | 2.4268E−01  | −1.6641E−01 | 5.5032E−02  |
| R12 | −4.5982E+00 | −2.7201E−01 | 2.0197E−01  | −1.0049E−01 | 3.1379E−02  | −5.0690E−03 |

| | Conic coefficient | Aspheric surface coefficients | | | |
|---|---|---|---|---|---|
| | k | A14 | A16 | A18 | A20 |
| R1  | 0.0000E+00  | −1.5843E+02 | 2.7915E+02  | −2.6479E+02 | 1.0316E+02  |
| R2  | 0.0000E+00  | 3.9576E+01  | −5.4590E+01 | 4.0950E+01  | −1.2830E+01 |
| R3  | 0.0000E+00  | 7.1122E+01  | −7.0721E+01 | 3.7195E+01  | −7.7916E+00 |
| R4  | 0.0000E+00  | −6.1817E+01 | 6.1278E+01  | −3.3304E+01 | 7.5992E+00  |
| R5  | 0.0000E+00  | −7.2828E+01 | 5.5594E+01  | −2.2593E+01 | 3.6757E+00  |
| R6  | 0.0000E+00  | −8.4666E+00 | 5.5792E+00  | −2.1696E+00 | 3.7736E−01  |
| R7  | 9.6364E−01  | 2.4695E+01  | −1.4788E+01 | 4.9497E+00  | −7.0917E−01 |
| R8  | 3.8677E+00  | 6.8337E+00  | −3.1180E+00 | 7.9469E−01  | −8.6429E−02 |
| R9  | −6.2560E+00 | 7.0045E−02  | −3.1035E−02 | 5.8257E−03  | −4.1663E−04 |
| R10 | −3.0000E+01 | −2.1865E−01 | 4.5678E−02  | −5.3988E−03 | 2.7693E−04  |
| R11 | −1.4472E+01 | −9.7442E−03 | 8.5408E−04  | −2.4054E−05 | −7.4629E−07 |
| R12 | −4.5982E+00 | 1.7086E−05  | 1.4043E−04  | −2.1774E−05 | 1.0895E−06  |

For convenience, an aspheric surface of each lens surface uses an aspheric surface shown in a formula (1) below. However, the present disclosure is not limited to the aspherical polynomials form shown in the formula (1).

$$z = (cr^2)/\{1+[1-(k+1)(c^2r^2)]^{1/2}\} + A4r^4 + A6r^6 + A8r^8 + A10r^{10} + A12r^{12} + A14r^{14} + A16r^{16} + A18r^{18} + A20r^{20} \quad (1)$$

Herein, K denotes a conic coefficient, A4, A6, A8, A10, A12, A14, A16, A18, and A20 denote aspheric surface coefficients, c denotes a curvature of a center region of the optical surface, r denotes a vertical distance from points on an aspheric surface curve to an optical axis, z denotes a depth of the aspheric surface (a point on the aspheric surface and a distance of which from the optical axis is r, a vertical distance between the point and a tangent to a vertex on the optical axis of the aspherical surface).

Table 3 and Table 4 show design data of inflexion points and arrest points of each of the lenses of the camera optical lens 10 according to the first embodiment of the present disclosure. P1R1 and P1R2 respectively denote the object side surface and the image side surface of the first lens L1, P2R1 and P2R2 respectively denote the object side surface and the image side surface of the second lens L2, P3R1 and P3R2 respectively denote the object side surface and the image side surface of the third lens L3, P4R1 and P4R2 respectively denote the object side surface and the image side surface of the fourth lens L4, P5R1 and P5R2 respectively denote the object side surface and the image side surface of the fifth lens L5, and P6R1 and P6R2 respectively denote the object side surface and the image side surface of the sixth lens L6. The data in the column named "inflexion point position" refer to vertical distances from inflexion points arranged on each lens surface to the optic axis of the camera optical lens 10. The data in the column named "arrest point position" refer to vertical distances from arrest points arranged on each lens surface to the optical axis of the camera optical lens 10.

TABLE 3

| | Number(s) of inflexion points | Inflexion point position 1 | Inflexion point position 2 | Inflexion point position 3 |
|---|---|---|---|---|
| P1R1 | 0 | / | / | / |
| P1R2 | 0 | / | / | / |
| P2R1 | 1 | 0.815 | / | / |
| P2R2 | 1 | 0.955 | / | / |

TABLE 3-continued

| | Number(s) of inflexion points | Inflexion point position 1 | Inflexion point position 2 | Inflexion point position 3 |
|---|---|---|---|---|
| P3R1 | 1 | 0.325 | / | / |
| P3R2 | 1 | 1.125 | / | / |
| P4R1 | 0 | / | / | / |
| P4R2 | 2 | 0.965 | 1.235 | / |
| P5R1 | 2 | 0.655 | 1.445 | / |
| P5R2 | 3 | 0.115 | 0.715 | 1.655 |
| P6R1 | 1 | 0.305 | / | / |
| P6R2 | 1 | 0.435 | / | / |

TABLE 4

| | Number(s) of arrest points | Arrest point position 1 | Arrest point position 2 |
|---|---|---|---|
| P1R1 | 0 | / | / |
| P1R2 | 0 | / | / |
| P2R1 | 0 | / | / |
| P2R2 | 0 | / | / |
| P3R1 | 1 | 0.445 | / |
| P3R2 | 0 | / | / |
| P4R1 | 0 | / | / |
| P4R2 | 0 | / | / |
| P5R1 | 1 | 1.095 | / |
| P5R2 | 2 | 0.205 | 1.105 |
| P6R1 | 1 | 0.575 | / |
| P6R2 | 1 | 1.115 | / |

Figure 2:
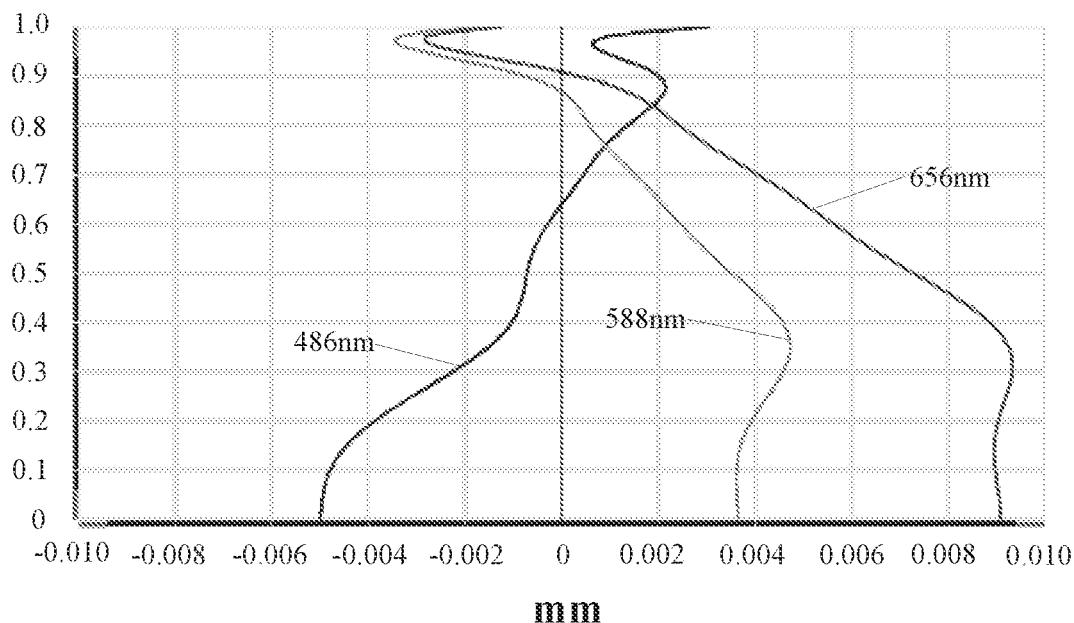
FIG. 2 is a schematic diagram of a longitudinal aberration of the camera optical lens shown in FIG. 1.
Figure 3:
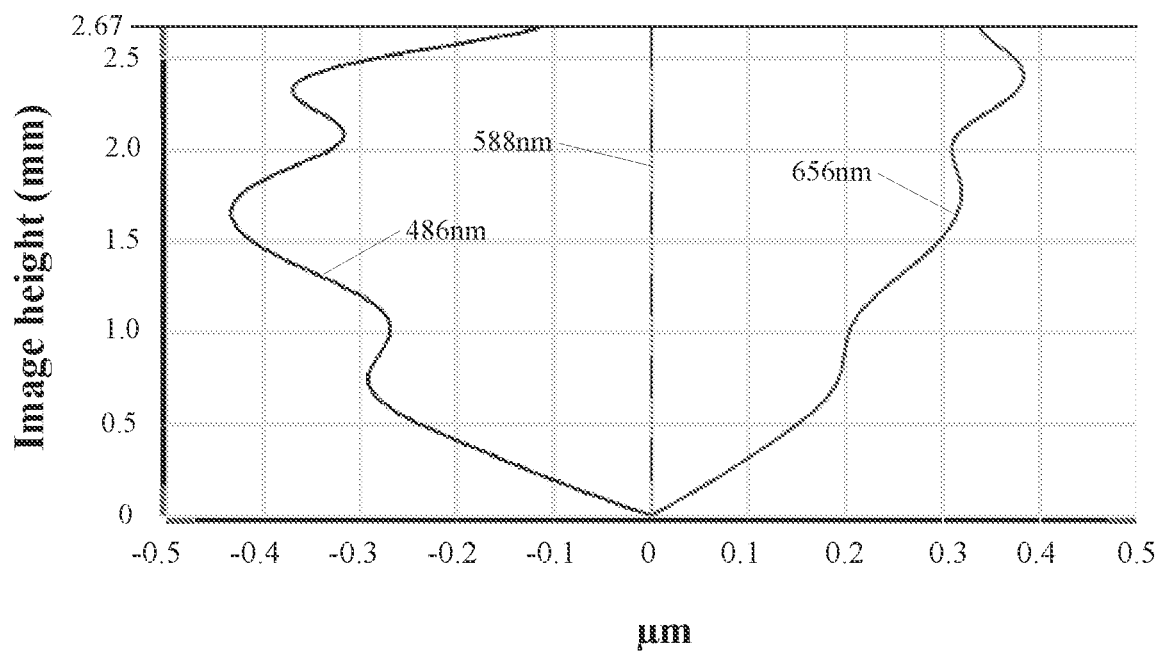
FIG. 3 is a schematic diagram of a lateral color of the camera optical lens shown in FIG. 1.
Figure 4:
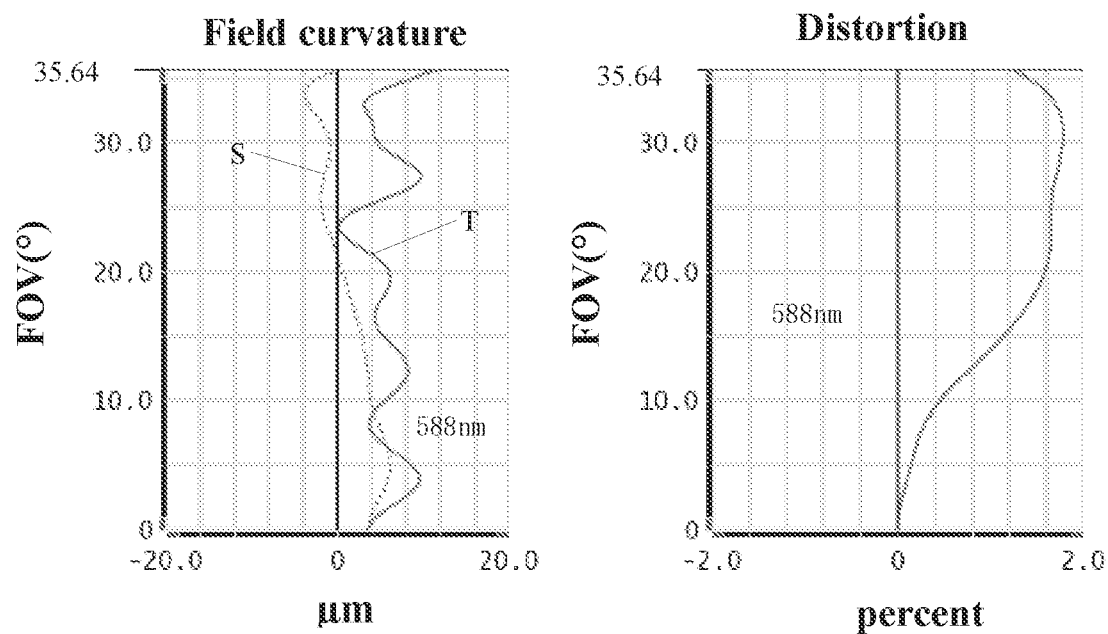
FIG. 4 is a schematic diagram of a field curvature and a distortion of the camera optical lens shown in FIG. 1.

FIG. 2 and FIG. 3 illustrate a longitudinal aberration and a lateral color of lights having wavelengths of 486 nm, 588 nm, and 656 nm after passing the camera optical lens 10 according to the first embodiment of the present disclosure, respectively. FIG. 4 illustrates a field curvature and a distortion of the light having the wavelength of 588 nm after passing the camera optical lens 10 according to the first embodiment of the present disclosure. A field curvature S in FIG. 4 is a field curvature in a sagittal direction, and T is a field curvature in a meridian direction.

The following table 13 further shows values corresponding to various parameters specified in conditional expressions in each of embodiments 1, 2 and 3.

As shown in table 13, various conditional expressions are satisfied in the first embodiment.

In the embodiment, an entrance pupil diameter is denoted as ENPD and the ENPD of the camera optical lens 10 is 1.316 mm. An image height is denoted as IH and the IH is 2.671 mm. A field of view is denoted as FOV and the FOV in a diagonal is 71.28 degree. The camera optical lens 10 meets the design requirements of large aperture, wide-angle, and ultra-thinness, on-axis and off-axis chromatic aberrations of which are fully corrected, and the camera optical lens 10 has excellent optical characteristics.

Embodiment 2

The second embodiment is basically the same as the first embodiment, and the meaning of the symbols is the same as that according to the first embodiment. Only differences are listed below.

In the second embodiment, the image side surface of the first lens L1 is concave in a paraxial region.

Figure 5:
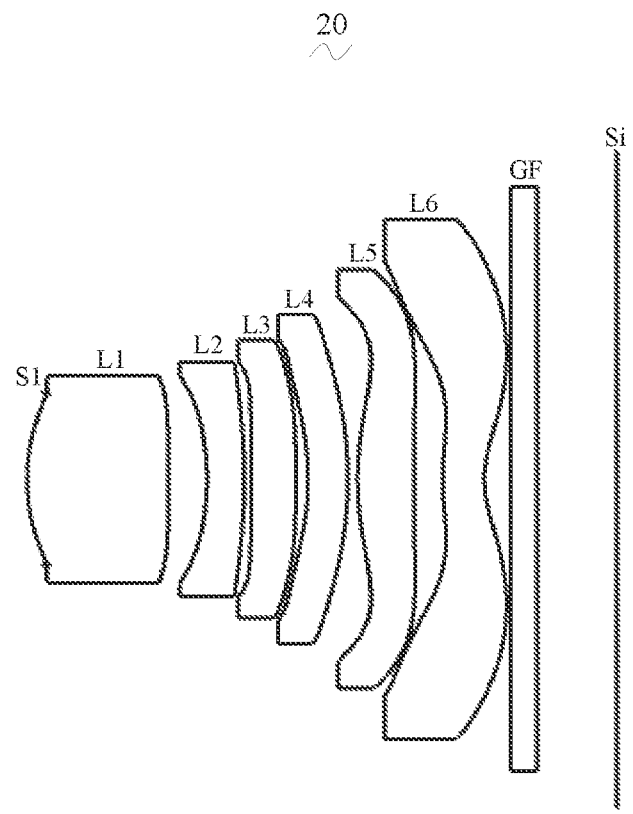
FIG. 5 is a schematic diagram of a structure of a camera optical lens according to a second embodiment of the present disclosure.

FIG. 5 shows the camera optical lens 20 according to the second embodiment of the present disclosure.

Table 5 and table 6 show design data of the camera optical lens 20 according to the second embodiment of the present disclosure.

TABLE 5

| | R | d | | nd | | vd |
|---|---|---|---|---|---|---|
| S1 | ∞ | d0 = | 0.148 | | | |
| R1 | 1.601 | d1 = | 1.116 | nd1 | 1.5352 v1 | 56.09 |
| R2 | 83.130 | d2 = | 0.309 | | | |
| R3 | −2.401 | d3 = | 0.300 | nd2 | 1.6713 v2 | 19.24 |
| R4 | −3.964 | d4 = | 0.050 | | | |
| R5 | 2202.048 | d5 = | 0.356 | nd3 | 1.5639 v3 | 38.77 |
| R6 | 8007.451 | d6 = | 0.099 | | | |
| R7 | −2.453 | d7 = | 0.314 | nd4 | 1.6713 v4 | 19.24 |
| R8 | −4.595 | d8 = | 0.081 | | | |
| R9 | 2.628 | d9 = | 0.450 | nd5 | 1.5602 v5 | 39.54 |
| R10 | −6.633 | d10 = | 0.226 | | | |
| R11 | 1.985 | d11 = | 0.331 | nd6 | 1.5352 v6 | 56.09 |

TABLE 5-continued

| | R | d | | nd | | vd |
|---|---|---|---|---|---|---|
| R12 | 0.851 | d12 = | 0.203 | | | |
| R13 | ∞ | d13 = | 0.210 | ndg | 1.5168 vg | 64.17 |
| R14 | ∞ | d14 = | 0.639 | | | |

Table 6 shows aspheric surface data of each of the lenses in the camera optical lens 20 according to the second embodiment of the present disclosure.

TABLE 6

| | Conic coefficient | Aspheric surface coefficients | | | | |
|---|---|---|---|---|---|---|
| | k | A4 | A6 | A8 | A10 | A12 |
| R1 | 0.0000E+00 | −1.6567E−03 | −2.0440E−01 | 2.5849E+00 | −1.9758E+01 | 9.1691E+01 |
| R2 | 0.0000E+00 | −7.7700E−02 | −2.4098E−01 | 1.4155E+00 | −8.2446E+00 | 2.8974E+01 |
| R3 | 0.0000E+00 | −7.0589E−02 | 5.4321E−01 | −7.2853E+00 | 3.9327E+01 | −1.2602E+02 |
| R4 | 0.0000E+00 | 1.4475E−01 | 1.3599E−01 | −2.3579E+00 | 6.9494E+00 | −7.1482E+00 |
| R5 | 0.0000E+00 | 1.7359E−02 | −3.1957E−01 | 1.5109E+00 | −6.5529E+00 | 1.7303E+01 |
| R6 | 0.0000E+00 | −3.0557E−01 | 3.9703E−01 | −1.6392E−02 | −1.2823E+00 | 3.0586E+00 |
| R7 | 1.2641E+00 | −3.1659E−01 | 2.2240E+00 | −7.4976E+00 | 1.6934E+01 | −2.5430E+01 |
| R8 | 4.8932E+00 | −3.9149E−01 | 1.6848E+00 | −4.5236E+00 | 7.9982E+00 | −9.2258E+00 |
| R9 | −1.5471E+01 | 1.3545E−01 | −4.3097E−01 | 4.6692E−01 | −2.3572E−01 | −1.4294E−02 |
| R10 | 9.8033E+00 | 4.8606E−01 | −1.1512E−01 | 1.5121E+00 | −1.2404E+00 | 6.5019E−01 |
| R11 | −3.0000E+01 | −3.2110E−01 | −3.1401E−02 | 2.4272E+00 | −1.6664E−01 | 5.4982E−02 |
| R12 | −5.8166E+00 | −2.6207E−01 | 1.9749E−01 | −1.0041E−01 | 3.1458E−02 | −5.0601E−03 |

| | Conic coefficient | Aspheric surface coefficients | | | |
|---|---|---|---|---|---|
| | k | A14 | A16 | A18 | A20 |
| R1 | 0.0000E+00 | −2.6257E+02 | 4.5228E+02 | −4.2927E+02 | 1.7238E+02 |
| R2 | 0.0000E+00 | −6.3292E+01 | 8.3876E+01 | −6.1631E+01 | 1.9381E+01 |
| R3 | 0.0000E+00 | 2.4910E+02 | −2.9720E+02 | 1.9682E+02 | −5.5464E+01 |
| R4 | 0.0000E+00 | −4.8737E+00 | 1.8430E+01 | −1.6165E+01 | 4.9465E+00 |
| R5 | 0.0000E+00 | −2.5952E+01 | 2.0838E+01 | −7.8914E+00 | 8.9715E−01 |
| R6 | 0.0000E+00 | −3.8249E+00 | 2.8165E+00 | −1.1593E+00 | 2.0559E−01 |
| R7 | 1.2641E+00 | 2.4694E+01 | −1.4789E+01 | 4.9489E+00 | −7.0932E−01 |
| R8 | 4.8932E+00 | 6.8336E+00 | −3.1180E+00 | 7.9471E−01 | −8.6432E−02 |
| R9 | −1.5471E+01 | 7.0010E−02 | −3.1048E−02 | 5.8273E−03 | −4.1373E−04 |
| R10 | 9.8033E+00 | −2.1862E−01 | 4.5684E−02 | −5.4003E−03 | 2.7558E−04 |
| R11 | −3.0000E+01 | −9.7446E−03 | 8.5688E−04 | −2.3426E−05 | −1.0410E−06 |
| R12 | −5.8166E+00 | 1.6953E−05 | 1.4022E−04 | −2.1816E−05 | 1.0908E−06 |

Table 7 and Table 8 show design data of inflexion points and arrest points of each of the lenses of the camera optical lens 20 according to the second embodiment of the present disclosure.

TABLE 7

| | Number(s) of inflexion points | Inflexion point position 1 | Inflexion point position 2 | Inflexion point position 3 |
|---|---|---|---|---|
| P1R1 | 0 | / | / | / |
| P1R2 | 2 | 0.115 | 0.835 | / |
| P2R1 | 1 | 0.795 | / | / |
| P2R2 | 1 | 0.865 | / | / |
| P3R1 | 1 | 0.175 | / | / |
| P3R2 | 1 | 0.015 | / | / |
| P4R1 | 0 | / | / | / |
| P4R2 | 0 | / | / | / |

TABLE 7-continued

| | Number(s) of inflexion points | Inflexion point position 1 | Inflexion point position 2 | Inflexion point position 3 |
|---|---|---|---|---|
| P5R1 | 1 | 0.575 | / | / |
| P5R2 | 2 | 0.185 | 0.585 | / |
| P6R1 | 3 | 0.265 | 1.125 | 1.555 |
| P6R2 | 1 | 0.415 | / | / |

TABLE 8

| | Number(s) of arrest points | Arrest point position 1 | Arrest point position 2 |
|---|---|---|---|
| P1R1 | 0 | / | / |
| P1R2 | 1 | 0.185 | / |
| P2R1 | 0 | / | / |
| P2R2 | 0 | / | / |
| P3R1 | 1 | 0.235 | / |
| P3R2 | 1 | 0.015 | / |
| P4R1 | 0 | / | / |
| P4R2 | 0 | / | / |
| P5R1 | 1 | 0.965 | / |
| P5R2 | 2 | 0.345 | 0.795 |
| P6R1 | 1 | 0.495 | / |
| P6R2 | 1 | 1.025 | / |

Figure 6:
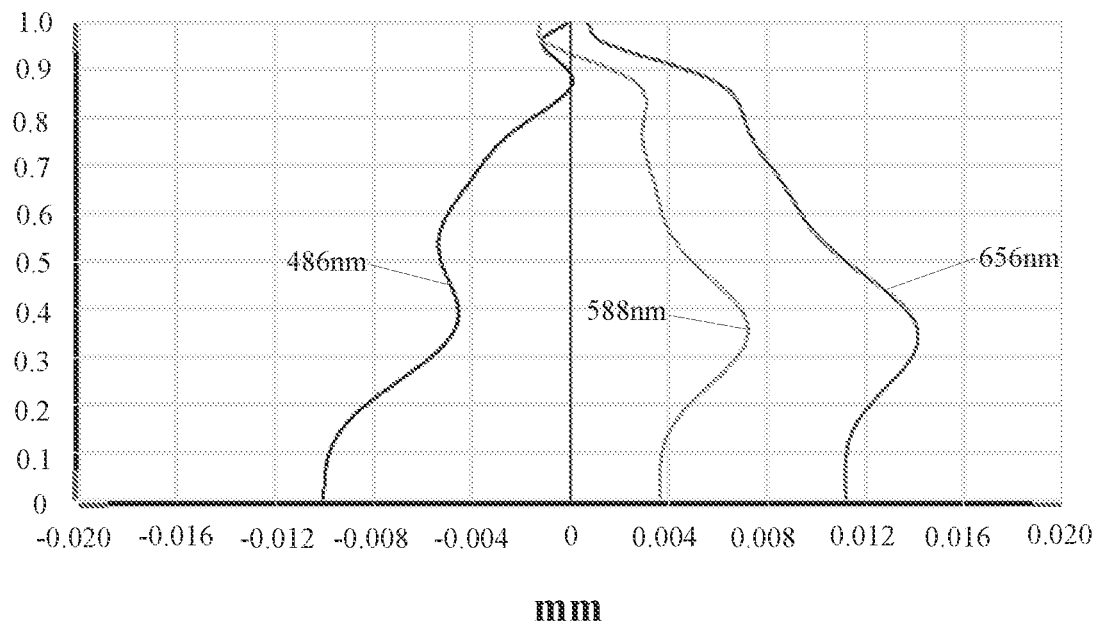
FIG. 6 is a schematic diagram of a longitudinal aberration of the camera optical lens shown in FIG. 5.
Figure 7:
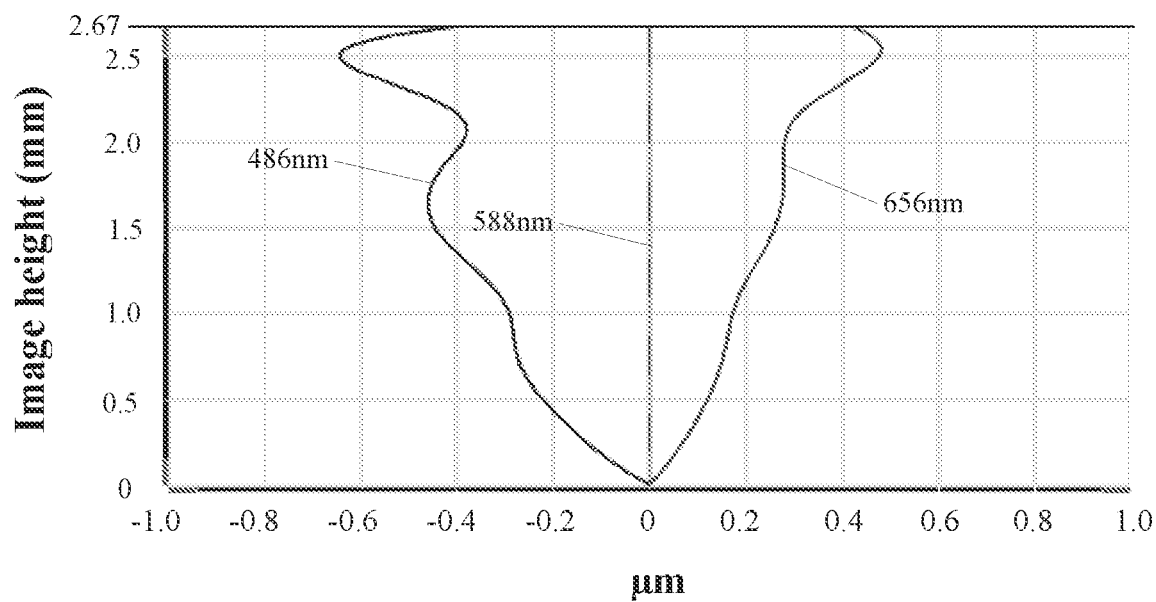
FIG. 7 is a schematic diagram of a lateral color of the camera optical lens shown in FIG. 5.
Figure 8:
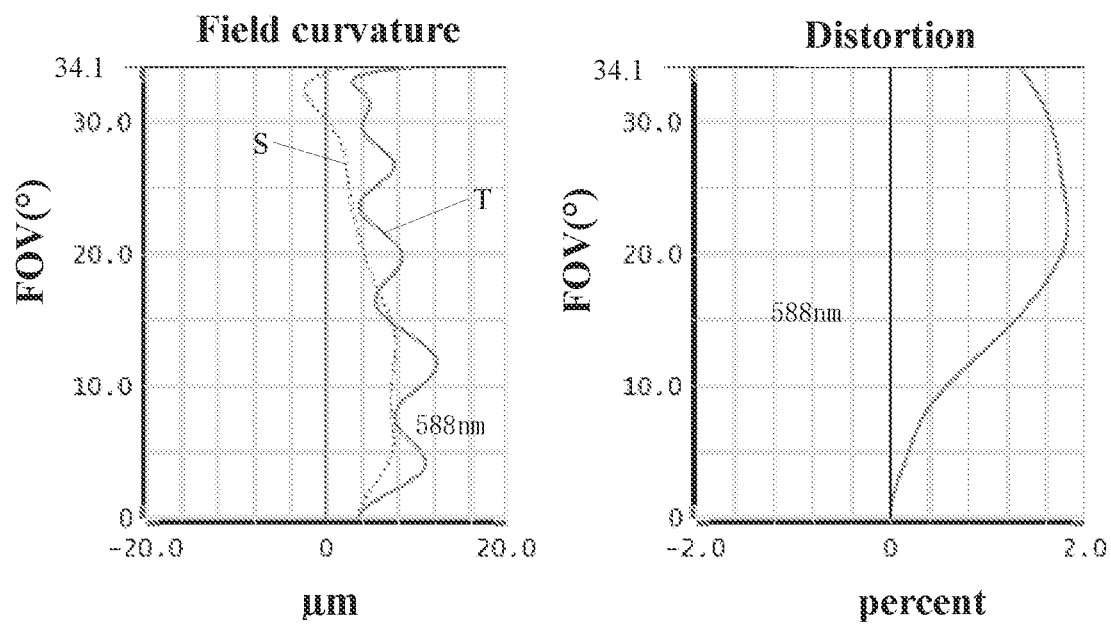
FIG. 8 is a schematic diagram of a field curvature and a distortion of the camera optical lens shown in FIG. 5.

FIG. 6 and FIG. 7 illustrate a longitudinal aberration and a lateral color of the lights having the wavelengths of 486 nm, 588 nm, and 656 nm after passing the camera optical lens 20 according to the second embodiment of the present disclosure, respectively. FIG. 8 illustrates a field curvature and a distortion of the light having the wavelength of 588 nm after passing the camera optical lens 20 according to the second embodiment of the present disclosure. A field curvature S in FIG. 8 is a field curvature in a sagittal direction, and T is a field curvature in a meridian direction.

As shown in table 13, the second embodiment satisfies various conditional expressions.

In the embodiment, an entrance pupil diameter is denoted as ENPD and the ENPD of the camera optical lens 20 is 1.391 mm. An image height is denoted as IH and the IH is 2.671 mm. A field of view is denoted as FOV and the FOV in a diagonal is 68.24 degree. The camera optical lens 20 meets the design requirements of large aperture, wide-angle, and ultra-thinness, the on-axis and off-axis chromatic aberrations of which are fully corrected, and the camera optical lens 20 has excellent optical characteristics.

Embodiment 3

The third embodiment is basically the same as the first embodiment, and the meaning of the symbols is the same as that according to the first embodiment. Only differences are listed below.

Figure 9:
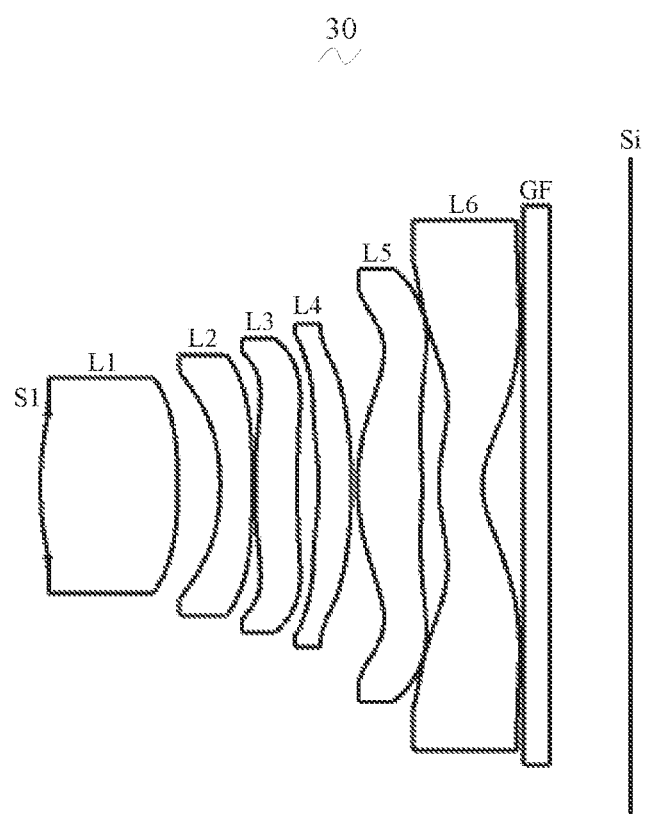
FIG. 9 is a schematic diagram of a structure of a camera optical lens according to a third embodiment of the present disclosure.

FIG. 9 shows the camera optical lens 30 according to the third embodiment of the present disclosure.

Table 9 and table 10 show design data of the camera optical lens 30 according to the third embodiment of the present disclosure.

TABLE 9

| | R | | d | | nd | | vd |
|---|---|---|---|---|---|---|---|
| S1 | ∞ | d0 = | −0.055 | | | | |
| R1 | 2.480 | d1 = | 1.089 | nd1 | 1.5352 | v1 | 56.09 |
| R2 | −4.380 | d2 = | 0.338 | | | | |
| R3 | −2.105 | d3 = | 0.260 | nd2 | 1.6713 | v2 | 19.24 |
| R4 | −4.220 | d4 = | 0.020 | | | | |
| R5 | 28.422 | d5 = | 0.333 | nd3 | 1.5579 | v3 | 41.29 |
| R6 | 81.435 | d6 = | 0.167 | | | | |
| R7 | −2.541 | d7 = | 0.260 | nd4 | 1.6713 | v4 | 19.24 |
| R8 | −6.685 | d8 = | 0.050 | | | | |
| R9 | 1.860 | d9 = | 0.512 | nd5 | 1.6068 | v5 | 27.26 |
| R10 | −2.884 | d10 = | 0.133 | | | | |
| R11 | 1.377 | d11 = | 0.346 | nd6 | 1.6553 | v6 | 20.66 |
| R12 | 0.659 | d12 = | 0.325 | | | | |
| R13 | ∞ | d13 = | 0.210 | ndg | 1.5168 | vg | 64.17 |
| R14 | ∞ | d14 = | 0.638 | | | | |

Table 10 shows aspheric surface data of each of the lenses in the camera optical lens 30 according to the third embodiment of the present disclosure.

TABLE 10

| | Conic coefficient | Aspheric surface coefficients | | | | |
|---|---|---|---|---|---|---|
| | k | A4 | A6 | A8 | A10 | A12 |
| R1 | 0.0000E+00 | −2.6296E−02 | −3.9509E−01 | 7.5393E+00 | −8.3851E+01 | 5.5108E+02 |
| R2 | 0.0000E+00 | −2.0253E−01 | 2.6531E−01 | −2.0171E+00 | 9.9696E+00 | −3.0998E+01 |
| R3 | 0.0000E+00 | −4.9035E−01 | 2.1164E+00 | −1.1488E+01 | 4.3897E+01 | −1.0998E+02 |
| R4 | 0.0000E+00 | 3.3316E−01 | −1.6820E+00 | 4.0505E+00 | −5.8260E+00 | 4.2834E+00 |
| R5 | 0.0000E+00 | 9.2529E−01 | −4.6646E+00 | 1.4055E+01 | −2.9266E+01 | 4.1545E+01 |
| R6 | 0.0000E+00 | 2.5740E−01 | −3.2506E−01 | −7.9480E−01 | 2.7307E+00 | −3.9971E+00 |
| R7 | 0.0000E+00 | −4.4489E−02 | 2.5968E+00 | −9.3378E+00 | 1.8156E+01 | −2.3150E+01 |
| R8 | 0.0000E+00 | −4.7331E−01 | 1.9938E+00 | −4.6214E+00 | 6.6245E+00 | −6.5301E+00 |
| R9 | 0.0000E+00 | 2.9164E−02 | −2.9932E−01 | 4.0257E−01 | −3.2913E−01 | 1.2069E−01 |
| R10 | 0.0000E+00 | 7.8932E−01 | −1.6826E+00 | 2.3900E+00 | −2.2110E+00 | 1.3154E+00 |
| R11 | −6.8788E+00 | −3.2347E−01 | −3.1616E−02 | 2.4282E−01 | −1.6662E−01 | 5.4994E−02 |
| R12 | −3.8451E+00 | −2.6154E−01 | 1.9911E−01 | −1.0014E−01 | 3.1478E−02 | −5.0618E−03 |
| | Conic coefficient | Aspheric surface coefficients | | | | |
| | k | A14 | A16 | A18 | A20 | |
| R1 | 0.0000E+00 | −2.1976E+03 | 5.2069E+03 | −6.7238E+03 | 3.6341E+03 | |
| R2 | 0.0000E+00 | 6.0575E+01 | −7.1382E+01 | 4.5656E+01 | −1.1920E+01 | |
| R3 | 0.0000E+00 | 1.7929E+02 | −1.8204E+02 | 1.0359E+02 | −2.4996E+01 | |
| R4 | 0.0000E+00 | −4.8289E−01 | −1.5425E+00 | 1.0113E+00 | −1.9487E−01 | |
| R5 | 0.0000E+00 | −3.9349E+01 | 2.3255E+01 | −7.5562E+00 | 1.0041E+00 | |
| R6 | 0.0000E+00 | 3.3374E+00 | −1.6148E+00 | 4.0978E−01 | −3.9356E−02 | |
| R7 | 0.0000E+00 | 1.9677E+01 | −1.0608E+01 | 3.2648E+00 | −4.3707E−01 | |

TABLE 10-continued

| | | | | | |
|---|---|---|---|---|---|
| R8 | 0.0000E+00 | 4.4126E+00 | −1.9028E+00 | 4.6512E−01 | −4.8958E−02 |
| R9 | 0.0000E+00 | −7.5677E−03 | −6.4704E−03 | 1.6418E−03 | −1.2512E−04 |
| R10 | 0.0000E+00 | −5.0092E−01 | 1.1832E−01 | −1.5815E−02 | 9.1491E−04 |
| R11 | −6.8788E+00 | −9.7429E−03 | 8.5668E−04 | −2.3397E−05 | −9.7164E−07 |
| R12 | −3.8451E+00 | 1.6413E−05 | 1.4000E−04 | −2.1830E−05 | 1.1021E−06 |

Table 11 and Table 12 show design data of inflexion points and arrest points of each of the lenses of the camera optical lens 30 according to the third embodiment of the present disclosure.

TABLE 11

| | Number(s) of inflexion points | Inflexion point position 1 | Inflexion point position 2 | Inflexion point position 3 |
|---|---|---|---|---|
| P1R1 | 0 | / | / | / |
| P1R2 | 2 | 0.115 | 0.835 | / |
| P2R1 | 1 | 0.795 | / | / |
| P2R2 | 1 | 0.865 | / | / |
| P3R1 | 1 | 0.175 | / | / |
| P3R2 | 1 | 0.015 | / | / |
| P4R1 | 0 | / | / | / |
| P4R2 | 0 | / | / | / |
| P5R1 | 1 | 0.575 | / | / |
| P5R2 | 2 | 0.185 | 0.585 | / |
| P6R1 | 3 | 0.265 | 1.125 | 1.555 |
| P6R2 | 1 | 0.415 | / | / |

TABLE 12

| | Number(s) of arrest points | Arrest point position 1 | Arrest point position 2 |
|---|---|---|---|
| P1R1 | 0 | / | / |
| P1R2 | 1 | 0.185 | / |
| P2R1 | 0 | / | / |
| P2R2 | 0 | / | / |
| P3R1 | 1 | 0.235 | / |
| P3R2 | 1 | 0.015 | / |
| P4R1 | 0 | / | / |
| P4R2 | 0 | / | / |
| P5R1 | 1 | 0.965 | / |
| P5R2 | 2 | 0.345 | 0.795 |
| P6R1 | 1 | 0.495 | / |
| P6R2 | 1 | 1.025 | / |

Figure 10:
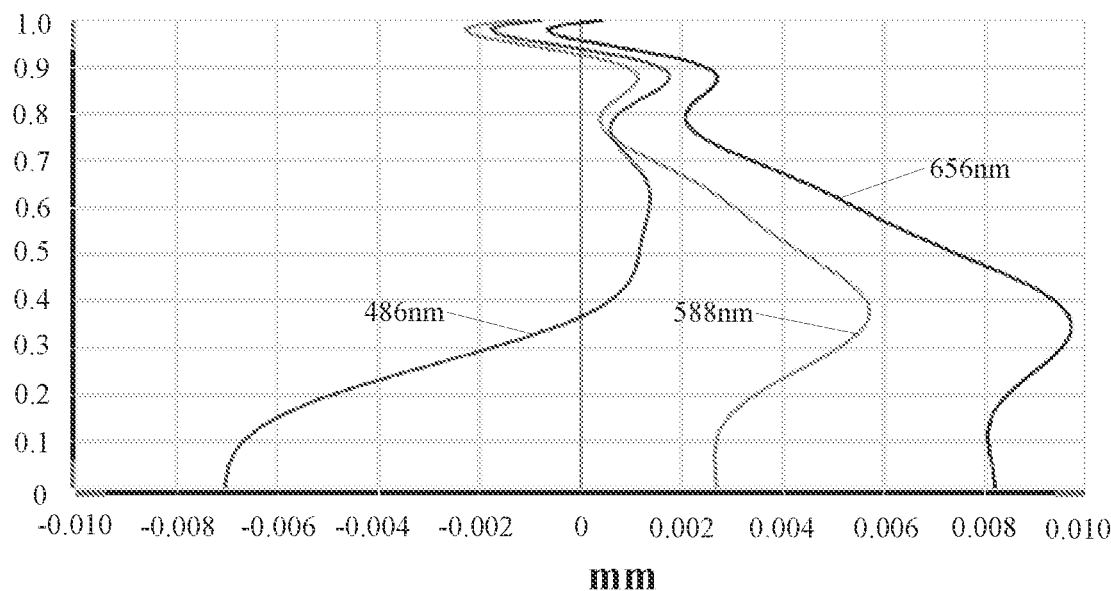
FIG. 10 is a schematic diagram of a longitudinal aberration of the camera optical lens shown in FIG. 5.
Figure 11:
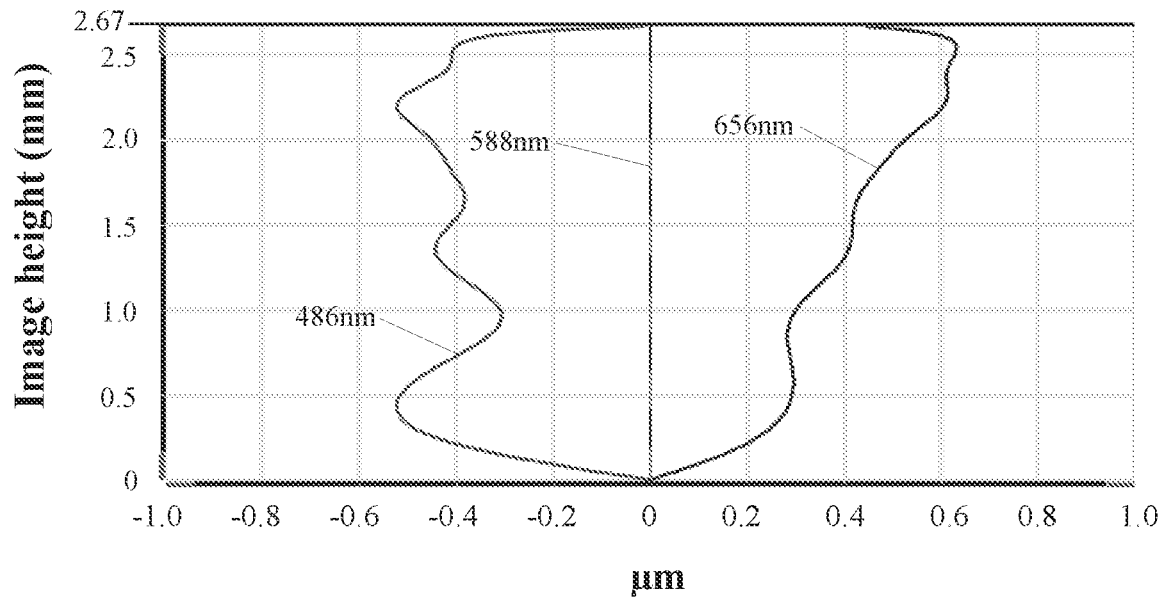
FIG. 11 is a schematic diagram of a lateral color of the camera optical lens shown in FIG. 5.
Figure 12:
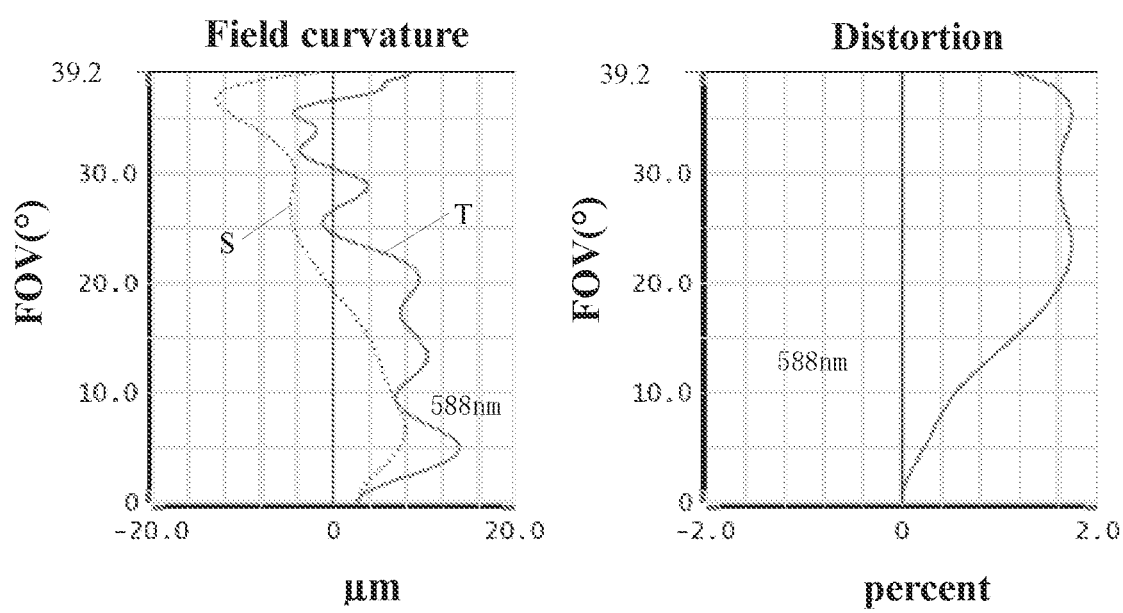
FIG. 12 is a schematic diagram of a field curvature and a distortion of the camera optical lens shown in FIG. 5.

FIG. 10 and FIG. 11 illustrate a longitudinal aberration and a lateral color of the lights having the wavelengths of 486 nm, 588 nm, and 656 nm after passing the camera optical lens 30 according to the third embodiment of the present disclosure, respectively. FIG. 12 illustrates a field curvature and a distortion of the light having the wavelength of 588 nm after passing the camera optical lens 30 according to the third embodiment of the present disclosure. A field curvature S in FIG. 12 is a field curvature in a sagittal direction, and T is a field curvature in a meridian direction.

The following table 13 lists numerical values corresponding to each conditional expression in the embodiment according to the above-mentioned conditional expressions. Obviously, the camera optical lens 30 of the embodiment satisfies the above-mentioned conditional expressions.

In the embodiment, an entrance pupil diameter is denoted as ENPD and the ENPD of the camera optical lens 30 is 1.158 mm. An image height is denoted as IH and the IH is 2.671 mm. A field of view is denoted as FOV and the FOV in the diagonal is 78.40 degree. The camera optical lens 30 meets the design requirements of the large aperture, wide-angle, and ultra-thinness, the on-axis and off-axis chromatic aberrations of which are fully corrected, and the camera optical lens 30 has excellent optical characteristics.

TABLE 13

| Parameters and conditions | Embodiment 1 | Embodiment 2 | Embodiment 3 |
|---|---|---|---|
| (d1 + d2)/d3 | 4.01 | 4.75 | 5.49 |
| f2/f | −2.97 | −2.52 | −2.03 |
| R5/R6 | 0.20 | 0.27 | 0.35 |
| f | 3.685 | 3.895 | 3.242 |
| f1 | 3.162 | 3.035 | 3.132 |
| f2 | −10.941 | −9.828 | −6.580 |
| f3 | 29131.351 | 5386.565 | 78.077 |
| f4 | −6.570 | −8.326 | −6.265 |
| f5 | 2.954 | 3.419 | 1.942 |
| f6 | −3.309 | −3.101 | −2.383 |
| FNO | 2.80 | 2.80 | 2.80 |
| TTL | 4.709 | 4.685 | 4.682 |
| IH | 2.671 | 2.671 | 2.671 |
| FOV | 71.28° | 68.24° | 78.40° |

It can be understood by one having ordinary skill in the art that the above-mentioned embodiments are specific embodiments of the present disclosure. In practical applications, various modifications can be made to these embodiments in forms and details without departing from the spirit and scope of the present disclosure.

What is claimed is:

1. A camera optical lens, comprising:
   six lenses, being sequentially from an object side to an image side, comprising:
   a first lens having a positive refractive power;
   a second lens having a negative refractive power;
   a third lens having a positive refractive power;
   a fourth lens having a negative refractive power; an object side surface of the fourth lens is concave in a paraxial region, an image side surface of the fourth lens is convex in a paraxial region;
   a fifth lens having a positive refractive power; and
   a sixth lens having a negative refractive power;
   wherein, a focal length of the camera optical lens is denoted as f, a focal length of the second lens is denoted as f2, a center curvature radius of an object side surface of the third lens is denoted as R5, a center curvature radius of an image side surface of the third lens is denoted as R6, an on-axis thickness of the first lens is denoted as d1, an on-axis distance, from an image side surface of the first lens to an object side surface of the second lens, is denoted as d2, an on-axis thickness of the second lens is denoted as d3, a focal length of the fourth lens is denoted as f4, a center curvature radius of the object side surface of the fourth lens is denoted as R7, a center curvature radius of the image side surface of the fourth lens is denoted as R8, an on-axis thickness of the fourth lens is denoted as d7, a total optical length of the camera optical lens is denoted as TTL, total number of lenses in the camera optical lens with refractive power is six, and the camera optical lens satisfies following relationships:

$4.00 \leq (d1+d2)/d3 \leq 5.50$;

$-3.00 \leq f2/f \leq -2.00$;

$0.20 \leq R5/R6 \leq 0.35$;

$-5.62 \leq f4/f \leq -1.49$;

$-10.47 \leq (R7+R8)/(R7-R8) \leq -1.86$;

$0.04 \leq d7/TTL \leq 0.08$.

2. The camera optical lens according to claim 1, wherein the object side surface of the first lens is convex in a paraxial region;
a focal length of the first lens is denoted as f1, a center curvature radius of the object side surface of the first lens is denoted as R1, a center curvature radius of the image side surface of the first lens is denoted as R2, and the camera optical lens satisfies following relationships:

$0.39 \leq f1/f \leq 1.64$;

$-3.34 \leq (R1+R2)/(R1-R2) \leq -0.18$;

$0.08 \leq d1/TTL \leq 0.36$.

3. The camera optical lens according to claim 2, wherein the camera optical lens satisfies following relationships:

$0.62 \leq f1/f \leq 1.31$;

$-2.09 \leq (R1+R2)/(R1-R2) \leq -0.23$;

$0.12 \leq d1/TTL \leq 0.29$.

4. The camera optical lens according to claim 1, wherein a center curvature radius of the object side surface of the second lens is denoted as R3, a center curvature radius of an image side surface of the second lens is denoted as R4, and the camera optical lens satisfies following relationships:

$-8.99 \leq (R3+R4)/(R3-R4) \leq 3.44$;

$0.02 \leq d3/TTL \leq 0.10$.

5. The camera optical lens according to claim 4, wherein the camera optical lens satisfies following relationships:

$-5.62 \leq (R3+R4)/(R3-R4) \leq 2.75$;

$0.03 \leq d3/TTL \leq 0.08$.

6. The camera optical lens according to claim 1, wherein the object side surface of the third lens is convex in a paraxial region, the image side surface of the third lens is concave in a paraxial region;
a focal length of the third lens is denoted as f3, an on-axis thickness of the third lens is denoted as d5, and the camera optical lens satisfies following relationships:

$1.66 \leq f3/f \leq 11858.63$;

$-4.14 \leq (R5+R6)/(R5-R6) \leq -1.00$;

$0.03 \leq d5/TTL \leq 0.15$.

7. The camera optical lens according to claim 6, wherein the camera optical lens satisfies following relationships:

$2.66 \leq f3/f \leq 9486.91$;

$-2.59 \leq (R5+R6)/(R5-R6) \leq -1.25$;

$0.05 \leq d5/TTL \leq 0.12$.

8. The camera optical lens according to claim 1, wherein an object side surface of the fifth lens is convex in a paraxial region, an image side surface of the fifth lens is convex in a paraxial region;
a focal length of the fifth lens is denoted as f5, a center curvature radius of the object side surface of the fifth lens is denoted as R9, a center curvature radius of the image side surface of the fifth lens is denoted as R10, an on-axis thickness of the fifth lens is denoted as d9, and the camera optical lens satisfies following relationships:

$0.30 \leq f5/f \leq 1.74$;

$-1.51 \leq (R9+R10)/(R9-R10) \leq -0.14$;

$0.05 \leq d9/TTL \leq 0.17$.

9. The camera optical lens according to claim 8, wherein the camera optical lens satisfies following relationships:

$0.48 \leq f5/f \leq 1.40$;

$-0.94 \leq (R9+R10)/(R9-R10) \leq -0.18$;

$0.08 \leq d9/TTL \leq 0.14$.

10. The camera optical lens according to claim 1, wherein an object side surface of the sixth lens is convex in a paraxial region, an image side surface of the sixth lens is concave in a paraxial region;
a focal length of the sixth lens is denoted as f6, a center curvature radius of the object side surface of the sixth lens is denoted as R11, a center curvature radius of the image side surface of the sixth lens is denoted as R12, an on-axis thickness of the sixth lens is denoted as d11, and the camera optical lens satisfies following relationships:

$-2.94 \leq f6/f \leq -0.49$;

$1.25 \leq (R11+R12)/(R11-R12) \leq 6.49$;

$0.03 \leq d11/TTL \leq 0.12$.

11. The camera optical lens according to claim 10, wherein the camera optical lens satisfies following relationships:

$-1.84 \leq f6/f \leq -0.61$;

$2.00 \leq (R11+R12)/(R11-R12) \leq 5.19$;

$0.05 \leq d11/TTL \leq 0.10$.

12. The camera optical lens according to claim 1, wherein an image height of the camera optical lens is denoted as IH, and the camera optical lens satisfies a following relationship:

$TTL/IH \leq 1.83$.

13. The camera optical lens according to claim 12, wherein the camera optical lens satisfies a following relationship:

$TTL/IH \leq 1.80$.

14. The camera optical lens according to claim 1, wherein a field of view of the camera optical lens is denoted as FOV, the FOV is greater than or equal to 66.19°.

15. The camera optical lens according to claim 14, wherein the FOV is greater than or equal to 67.56°.

16. The camera optical lens according to claim 1, wherein an F number of the camera optical lens is denoted as FNO, the FNO is less than or equal to 2.90.

17. The camera optical lens according to claim 16, wherein the FNO is less than or equal to 2.84.

18. The camera optical lens according to claim 16, wherein a combined focal length of the first lens and the second lens is denoted as f12, and satisfies a following relationship:

$0.51 \leq f12/f \leq 2.32.$

* * * * *